United States Patent
Takeyasu et al.

(10) Patent No.: US 10,055,078 B2
(45) Date of Patent: Aug. 21, 2018

(54) TOUCH SENSOR

(71) Applicant: NITTO DENKO CORPORATION, Ibaraki-shi, Osaka (JP)

(72) Inventors: Tomohiro Takeyasu, Ibaraki (JP); Ikuo Kawamoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/302,844

(22) PCT Filed: Mar. 31, 2015

(86) PCT No.: PCT/JP2015/060127
§ 371 (c)(1),
(2) Date: Oct. 7, 2016

(87) PCT Pub. No.: WO2015/156169
PCT Pub. Date: Oct. 15, 2015

(65) Prior Publication Data
US 2017/0031481 A1    Feb. 2, 2017

(30) Foreign Application Priority Data
Apr. 7, 2014 (JP) ................................. 2014-078542

(51) Int. Cl.
*G06F 3/044* (2006.01)
*G02B 5/30* (2006.01)
(Continued)

(52) U.S. Cl.
CPC .............. *G06F 3/044* (2013.01); *B32B 15/08* (2013.01); *G02B 5/3033* (2013.01); *G06F 3/041* (2013.01);
(Continued)

(58) Field of Classification Search
CPC .................. G06F 3/044; G06F 3/041; G06F 2203/04103; G02B 5/3033; B32B 15/08; B32B 2457/208
See application file for complete search history.

(56) References Cited

U.S. PATENT DOCUMENTS

| 6,689,458 B1 | 2/2004 | Mikoshiba et al. | |
| 2011/0102361 A1* | 5/2011 | Philipp | G06F 3/044 345/174 |

(Continued)

FOREIGN PATENT DOCUMENTS

| EP | 1 132 926 A1 | 9/2001 |
| JP | 10-133817 A | 5/1998 |

(Continued)

OTHER PUBLICATIONS

Office Action dated Mar. 14, 2017, issued in counterpart Korean Application No. 10-2016-7023605, with English translation. (8 pages).

(Continued)

*Primary Examiner* — Mihir K Rayan
(74) *Attorney, Agent, or Firm* — Westerman, Hattori, Daniels & Adrian, LLP

(57) ABSTRACT

To provide a touch senor having an improved productivity, and also achieving high reliability since there is no occurrence of a wire break in a metal wiring and having good usability since the metal wiring layer is less likely to be visually recognized. A touch senor of the present invention includes a film substrate (11) having a plurality of protrusions on both surfaces (11a), (11b) thereof, a metal wiring layer (12) provided over one surface (11a) of the film substrate, a circular polarizer film (14) provided at a viewing side A of film substrate (11), and a metal wiring layer (15) provided over the other surface (11b) of the film substrate (11). The metal wiring layer (12) has a line width of greater (Continued)

than 5 μm but less than or equal to 8 μm, and a thickness of greater than or equal to 0.1 μm but less than 0.5 μm.

7 Claims, 4 Drawing Sheets

(51) Int. Cl.
    *B32B 15/08*     (2006.01)
    *G06F 3/041*     (2006.01)

(52) U.S. Cl.
    CPC .............. *B32B 2457/208* (2013.01); *G06F 2203/04103* (2013.01)

(56) References Cited

U.S. PATENT DOCUMENTS

| | | | |
|---|---|---|---|
| 2012/0306771 A1* | 12/2012 | Chen | G06F 3/0418 345/173 |
| 2013/0133933 A1* | 5/2013 | Tsuno | H05K 1/0313 174/255 |
| 2014/0292714 A1* | 10/2014 | Lee | G06F 3/046 345/174 |

FOREIGN PATENT DOCUMENTS

| | | |
|---|---|---|
| JP | 2009-277924 A | 11/2009 |
| JP | 2011-180769 A | 9/2011 |
| JP | 2012-18590 A | 1/2012 |
| JP | 2013-107349 A | 6/2013 |
| KR | 10-2011-0021532 A | 3/2011 |
| WO | 01/16963 A1 | 3/2001 |
| WO | 2011/158692 A1 | 12/2011 |

OTHER PUBLICATIONS

International Preliminary Report on Patentability (Form PCT/IB/373) issued in counterpart International Application No. PCT/JP2015/060127 dated Oct. 12, 2016, with Form PCT/ISA/237, with English translation. (12 pages).

International Search Report dated Jun. 23, 2015, issued in counterpart International Application No. PCT/JP2015/060127 (2 pages).

Decision for Grant of Patent dated Sep. 27, 2017, issued in counterpart Korean Application No. 10-2016-7023605, with English translation. (3 pages).

\* cited by examiner

TOUCH SENSOR

CROSS REFERENCE TO RELATED APPLICATIONS

This is the National Stage of International Application No. PCT/JP2015/060127, filed Mar. 31, 2015, which claims the benefit of Japanese Patent Application No. 2014078542, filed Apr. 7, 2014, the disclosure of which are hereby incorporated by reference in their entirety.

TECHNICAL FIELD

The present invention relates to a touch sensor that can be applied to an input display device or the like capable of inputting information by a touch with a finger, a stylus pen and the like.

BACKGROUND ART

Conventionally a touch sensor is known which has metal wiring layers on both surfaces of a transparent substrate and a circular polarizer film laminated at a viewing side of the metal wiring layers. Such a touch sensor can be made with a larger area and has a high sensor accuracy, and thus expected to be applied to laptop PCs or the like that are touch operable.

DOCUMENT LIST

Patent Document(s)

Patent Document 1: Japanese Laid-Open Patent Publication No, 2011-180769

SUMMARY OF INVENTION

Technical Problem

However, the conventional touch sensor has a problem that a pattern of a metal wiring layer is still visually recognizable by a user of a touch sensor, and thus there is a need to mitigate such a problem.

It is an object of the present invention to provide a touch sensor having an improved productivity, and also achieving high reliability since there is no occurrence of a wire break in a metal wiring, and having good usability since the metal wiring layer is less likely to be visually recognized.

Solution to Problem

The inventors carried out assiduous studies on a configuration of a touch sensor, and as a result, reached the findings that, by focusing on a surface geometry of the film substrate, as well as sizes of metal wiring layers provided over both surfaces of the film substrate and an arrangement of a circular polarizer film, and making them have a suitable configuration, size and arrangement, a touch sensor can be provided that has an improved productivity, and also achieving high reliability since there is no occurrence of a wire break in a metal wiring and having good usability since a mesh shaped pattern of the metal wiring layer is less likely to be visually recognized.

That is to say, the summary of the present invention is as follows.

(1) A touch sensor including:
a film substrate having a plurality of protrusions on both surfaces thereof,
a first metal wiring layer provided as a pattern over a surface at a viewing side of the film substrate;
a circular polarizer film laminated at a viewing side of the first metal wiring layer; and
a second metal wiring layer provided as a pattern over a surface at a side opposite to the viewing side of the film substrate,
each of the first and second metal wiring layers having a line width of greater than 5 μm but less than 8 μm, and each of the first and second metal wiring layers having a thickness of greater than or equal to 0.1 μm but less than 0.5 μm.

(2) The touch sensor according to aforementioned (1), wherein the protrusion has an outer diameter of greater than 0 but less than or equal to 3 μm in a plan view of a surface of the film substrate at a side where one of the first metal wiring layer and the second metal wiring layer is provided.

(3) The touch sensor according to aforementioned (1), wherein the protrusion has a height of greater than 0 but less than 3 μm.

(4) The touch sensor according to aforementioned (1), wherein each of the first and second metal wiring layers has a flattened geometry, and a ratio of the line width to the thickness is 15 to 50.

(5) The touch sensor according to aforementioned (1), wherein each of the first and second metal wiring layers is provided in a mesh shape.

(6) The touch sensor according to aforementioned (1), wherein the film substrate is a polymer film having an optically isotropic property.

(7) The touch sensor according to aforementioned (6), wherein the polymer film comprises polycycloolefin or polycarbonate.

Effects of Invention

According to the invention, a plurality of protrusions are provided on a surface of a film substrate. Accordingly, the film substrate is given a slippery property and resistance to abrasion. When forming first and second metal wiring layers continuously, productivity can be improved by increasing a film formation rate thereof while maintaining a high quality.

Each of the first and second metal wiring layers have a predetermined line width, and, on a surface of the first metal wiring layer at a viewing side, a circular polarizer film is provided. The circular polarizer film has a function of absorbing light rays reflecting off the metal wiring layers when light from outside is incident on the touch sensor. Thereby, when laminating each metal wiring layer on the film substrate, a wire break in a metal wiring due to the protrusions of the film substrate can be prevented and high reliability can be achieved. Also, both metal wiring layers such as mesh patterns can be prevented from becoming bright and visually recognizable, and thus a good usability can be achieved.

Further, each of the first and second metal wiring layers has a thickness smaller than that of the metal wiring layer of the related art, which is greater than or equal to 0.1 μm but less than 0.5 μm. With such a configuration, both metal wiring layers can be made less visually recognizable, since the side surface of each of the metal wiring layers does not become bright when light from outside is obliquely incident on a touch sensor.

DESCRIPTION OF THE EMBODIMENTS

Hereinafter, embodiments of the present invention will be described in detail with reference to the attached drawings.

Figure 1:
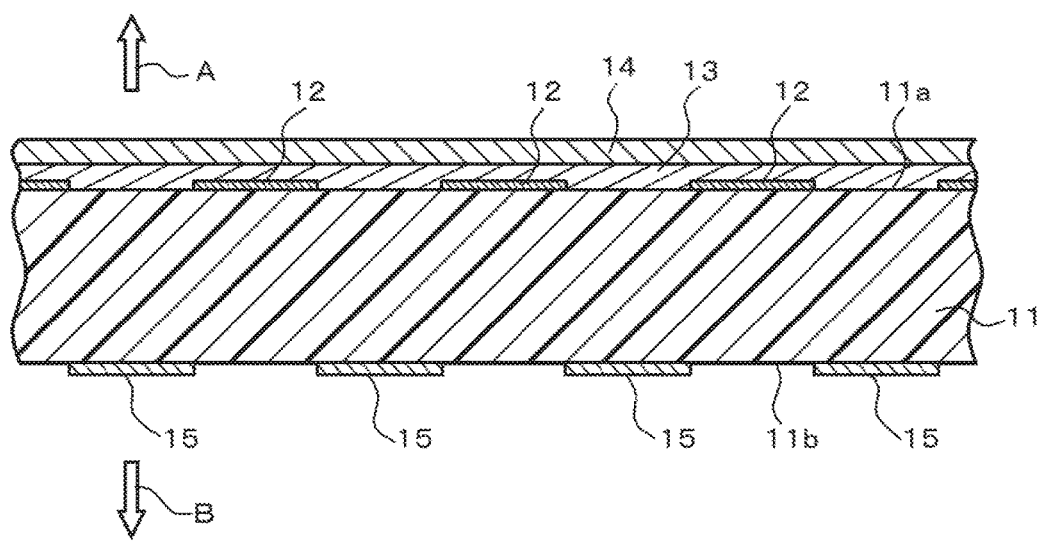
FIG. 1 is a cross sectional view schematically showing a configuration of a touch sensor according to an embodiment of the present invention.

FIG. 1 is a diagram schematically showing a configuration of a touch sensor according to the present embodiment. It is to be noted that length, width, and thickness of each element shown in FIG. 1 are exemplary, and length, width, and thickness of each element of the touch sensor of the present invention are not limited to those shown in FIG. 1.

As shown in FIG. 1, the touch sensor of the present invention has a film substrate 11 having a plurality of protrusions, to be described below, on both surfaces 11a, 11b thereof, a metal wiring layer 12 (first metal wiring layer) provided on one of the surfaces 11a of the film substrate, a circular polarizer film 14 provided at a viewing side A of the film substrate 11, and a metal wiring layer 15 (second metal wiring layer) provided on another surface 11b of the film substrate 11.

Figure 2A:
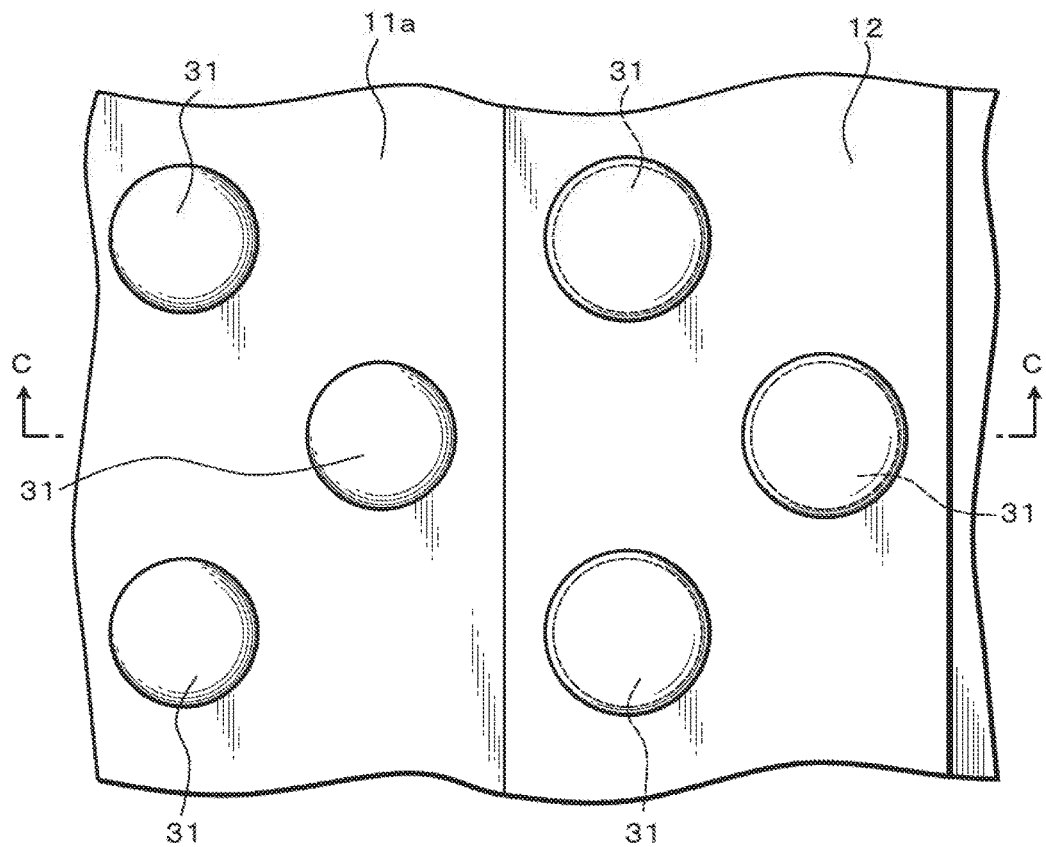
FIG. 2A is a partially enlarged view in a plan view of the touch sensor shown in FIG. 1.
Figure 2B:
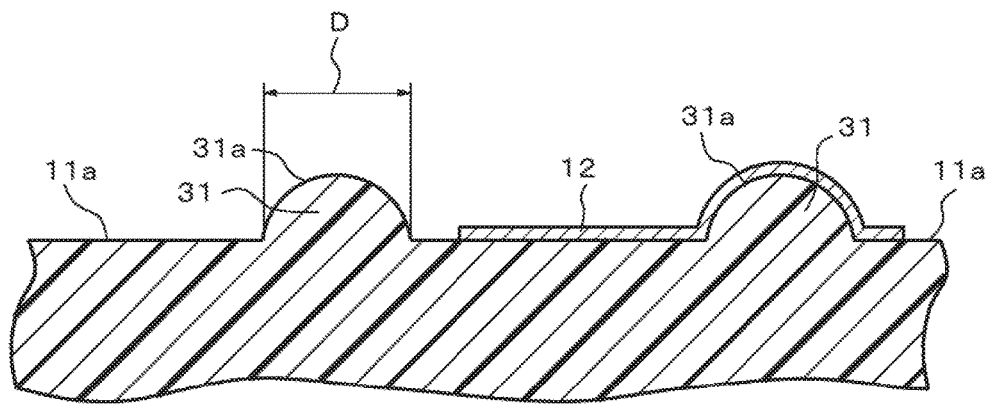
FIG. 2B is partially enlarged view of the touch sensor taken along line C-C in FIG. 2A.

Specifically, the film substrate 11 has a plurality of protrusions 31 on a surface 11a thereof at a side where the metal wiring layer 12 is to be provided as shown in FIGS. 2A and 2B. Each wiring constituting the metal wiring layer 12 is provided continuously over both the surface 11a of the film substrate 11 and a surface 31a of the protrusion 31. The metal wiring layer 12 has a line width of greater than 5 μm but less than or equal to 8 μm, and the metal wiring layer 12 has a thickness of greater than or equal to 0.1 μm but less than 0.5 μm. Further the film substrate 11 has a plurality of protrusion (not show that are similar to the plurality of protrusions 31, on a surface 11b at a side where the metal wiring layer 15 is provided. Similarly to the metal wiring layer 12, the metal wiring layer 15 has a line width of greater than 5 μm but less than or equal to 8 μm and the metal wiring layer 15 has a thickness of greater than or equal to 0.1 μm but less than 0.5 μm.

As for the touch sensor, a surface resistance value at a side provided with each metal wiring layer is preferably 0.1 Ω/□ to 400 Ω/□, more preferably 0.1 Ω/□ to 100 Ω/□, and particularly preferably 1 Ω/□ to 60 Ω/□. The touch sensor has a transmittance of preferably greater than or equal to 30%, and more preferably greater than or equal to 40%.

As long as the touch sensor of the present invention has a film substrate 11, a metal wiring layer 12 and a circular polarizer film 14, in this order, at a viewing side A, it may include another layer between the respective layers. For example, the touch sensor may be provided with an adhesive layer 13 that is disposed between the metal wiring layer 12 and a circular polarizer film 14 (FIG. 1).

(Film Substrate)

The film substrate as used herein supports the metal wiring layers. The film substrate may be single-layered or may be multi-layered. The film substrate has a thickness of preferably 20 μm to 200 μm, considering the transparency and ease of handling.

The film substrate has a plurality of protrusions on both surfaces thereof where the metal wiring layers are to be provided. By providing a plurality of protrusions on the surfaces of the film substrate, the film substrate is made to have a slippery property and resistance to abrasion, and when forming a metal wiring layer continuously, productivity can be improved by increasing a film formation rate thereof while maintaining a high quality.

A protrusion has an outer diameter D of greater than 0 but less than or equal to 3 μm and preferably 0.1 μm to 2 μm, in a plan view of a surface of the film substrate at a side where the metal wiring layer is to be provided. The outer diameter of the protrusion can be measured, for example, by carrying out an image observation with a predetermined magnification on a surface of the film substrate at a side where the metal wiring layer is to be provided. In a case where the outer diameter D is less than or equal to 3 μm, it is possible to positively prevent a wire break from being produced in the metal wiring near a boundary section between the surface of the film substrate and the surface of the protrusion.

Taking a flat surface of the film substrate as a reference level, the height of the protrusion is preferably greater than 0 but less than or equal to 3 μm, and more preferably, 0.1 μm to 2 μm.

In the present embodiment, the geometry of the protrusion is generally a dome shape with a cross section along the plane of the film substrate being generally circular, and a cross section in a thickness direction being generally semi-circular (FIGS. 2A and 2B). However, the protrusion of the present invention may be of a geometry other than a dome shape, as long as the protrusions provide the film substrate with a slippery property and resistance to abrasion, and high quality metal wiring layers can be formed continuously at a high speed.

As a measure of providing protrusions on a film substrate, it is possible to use a technique such as dispersing a lubricant in the film substrate or applying a binder, in which a plurality of particles are dispersed, on a film surface.

A film constituting the film substrate is preferably a polymer film having an optically isotropic property. In the present invention, "having an optically isotropic property" means having an in-plane phase difference measured at a wavelength of 590 nm that has a value of less than 10 nm. By using such a polymer film, when light from outside is incident on the touch sensor, a change in the phase of light between the two wiring layers is small, and thus light rays reflected off the metal wiring layers respectively can be effectively blocked by a circular polarizer film. Such a polymer film is, for example, a cast film which is not subjected to a stretching process.

The aforementioned polymer film is, for example, a polycycloolefin film or a polycarbonate film. For example, such polymer films are available from Zeon Corporation, Teijin Chemicals Ltd., and so on.

(Metal Wiring Layers)

Figure 3A:
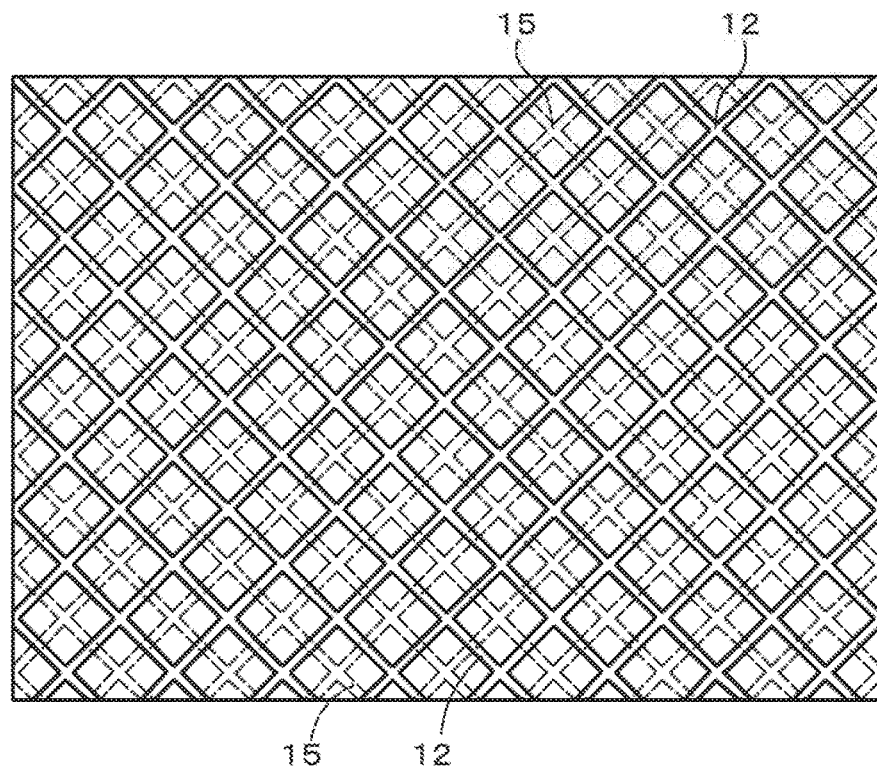
FIG. 3A is a plan view showing patterns of the metal wiring layers shown in FIG. 1 and showing a positional relationship between the two metal wiring layers provided respectively on both surfaces of the film substrate.
Figure 3B:
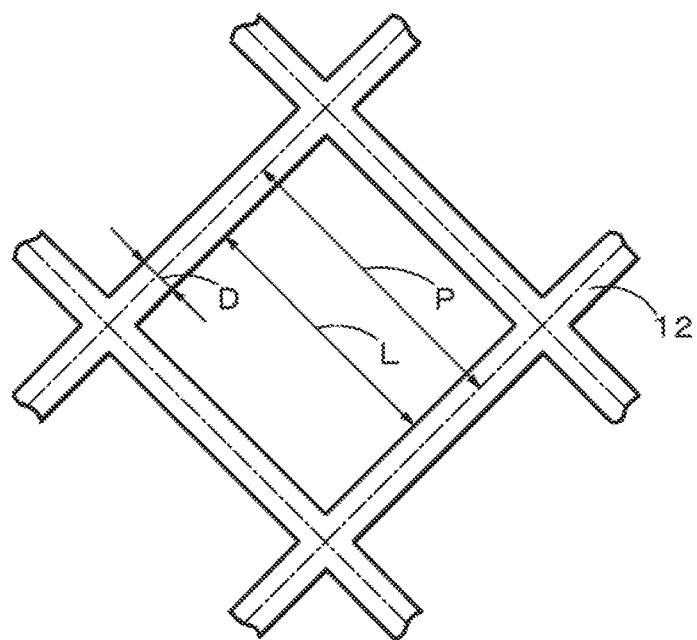
FIG. 3B is an enlarged view showing a unit pattern of each metal wiring layer.

The metal wiring layers as used herein are provided as a pattern, for example, in a mesh shape to provide translucency. The mesh pattern of the aforementioned metal wiring layers is not particularly limited, and for example, provided as a square lattice a diamond-shaped lattice, or a polygonal lattice. For example, as shown in FIG. 3A, in a case where the metal wiring layers 12 and 15 have a square lattice pattern, the metal wiring layer 12 and the metal wiring layer 15 are disposed such that they are displaced by a half pitch with respect to each other. A pitch interval P in the metal wiring layer 12 is defined as a length between the center of one of the two wirings that are disposed close to each other and the center of the other wiring and a length L of a mesh opening is defined as a value obtained by subtracting a line width D of the aforementioned wiring from the aforementioned pitch interval (FIG. 3B), A material forming the metal wiring layers is not limited as long as it has electrical conductivity, but it is preferably silver, copper or an alloy thereof, and more preferably, copper.

Each of the metal wiring layers has a line width of greater than 5 µm but less than 8 µm, and preferably greater than 5.5 µm but less than or equal to 7 µm. With a line width within such a range, a wire break due to the protrusions of the film substrate can be prevented. With a line width of less than or equal to 5 µm, the mesh pattern of the metal wiring layers can be made less visually recognizable, but because of the protrusions of the film substrate, a wire break in a metal wiring occurs more frequent, and quality and reliability will decrease when mass-produced. On the other hand, with the line width of greater than or equal to 8 µm, the mesh pattern of the metal wiring layers is visually recognizable in a noticeable manner.

Each of the metal wiring layers has a thickness of greater than or equal to 0.1 µm but less than 0.5 µm, preferably greater than or equal to 0.1 µm but less than or equal to 0.4 µm, and more preferably, 0.15 µm to 0.35 µm. With each of the metal wiring layers having a thickness of, for example, less than 2 µm, the mesh pattern can be furthermore prevented from being visually recognizable. With such a configuration, it can be made less visually recognizable, since the side surface of the metal wiring layer does not become bright when light from outside is obliquely incident on a touch sensor.

The metal wiring layers of the present invention is characterized in that each metal wiring layer has a flattened shape, and a ratio of the line width to the thickness (line width/thickness) is preferably greater than or equal to 10 but less than 80, and more preferably, 15 to 50. A touch sensor satisfying such a relationship has a good productivity, and a wire break in the metal wiring does not occur and the mesh pattern of the metal wiring layers is less visually recognizable.

In order to obtain an electric conductivity required for a touch panel sensor, the metal wiring layer has a cross sectional area of preferably 0.5 µm$^2$ to 4 µm$^2$, more preferably 0.5 µm$^2$ to 3.2 µm$^2$, and particularly preferably 0.5 µm$^2$ to 2.5 µm$^2$.

In order to obtain sufficient translucency, each of the metal wiring layers has a pitch interval of preferably 200 µm to 800 µm, and more preferably, 350 µm to 650 µm. Each of the metal wiring layers has an aperture ratio of preferably 95% to 99%, and more preferably, 96% to 99%.

A method of forming each of the aforementioned metal wiring layers may be, for example, a method including forming a metal layer over an entire surface of the film substrate, thereafter laminating a predetermined resist pattern (resist pattern) on the metal layer, and removing the metal layer in an unnecessary region by etching (etching) such that a mesh-shaped metal wiring layer is formed. For example, the method of forming the metal layer is a sputtering (spattering) method, a plating (plating) method or a combination thereof.

(Circular Polarizer Film)

Figure 4:
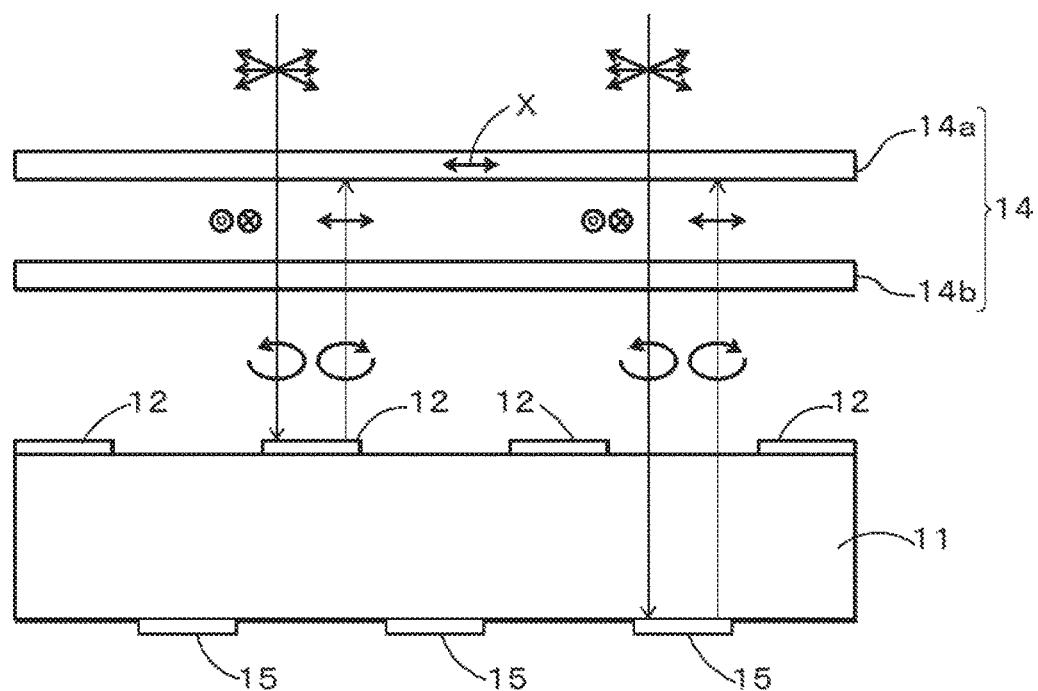
FIG. 4 is an explanatory diagram showing a principle of how reflected light rays are absorbed by a circular polarizer film shown in FIG. 1.

A circularly-polarized film as used herein is not particularly limited as long as it has a function of converting linearly polarized light into circularly polarized light and, as shown in FIG. 4, it is typically a laminated body of a liner polarizer film 14a and a λ/4 retardation film 14b.

In the present invention, a "λ/4 retardation film" means a retardation film having, for example, an in-plane phase difference value of ¼ for a measurement wavelength λ. However, it does not need to be strictly ¼, and for example, when measured at a wavelength of 590 nm, an in-plane phase difference value may be 120 nm to 180 nm.

By being laminated at a viewing side A of the metal wiring layer 12, when light from outside is incident on the touch sensor, the circular polarizer film as described above absorbs light rays reflected off each of the metal wiring layers and prevents the pattern from becoming bright and visually recognizable. Explaining more specifically with reference to FIG. 4, first, regarding the metal wiring layer 12, light from outside (natural light that does not have an anisotropic property in a direction of oscillation of light) that is incident on the touch sensor is converted into a linearly polarized light oscillating in a horizontal direction as it passes through the linear polarizer film 14a, and is incident on the λ/4 retardation film 14b. The linearly polarized light that is incident on the λ/4 retardation film 14b is converted, for example, into a clockwise circularly polarized light and reflects off a surface of the metal wiring layer 12. The reflected circularly polarized light is converted into a circularly polarized light in a reverse (anticlockwise) direction upon reflection and is incident on the λ/4 retardation film 14b. The anticlockwise circularly polarized light incident on the λ/4 retardation film 14b is converted into a linearly polarized light oscillating in a direction corresponding to an absorption axis X of the linear polarizer film 14a (a horizontal direction that differs by 90 degrees from the orientation at the time of incidence), and absorbed by the linear polarizer film 14a. Regarding the metal wiring layer 15, the reflected light ray is absorbed by the linear polarizer film 14a with a principle similar to the aforementioned principle, except that the clockwise circularly polarized light from the λ/4 retardation film 14b penetrates through the anisotropic film substrate 11, and that the circularly polarized light reflected on a surface of the metal wiring layer 15 penetrates through the film substrate 11. As described above, by arranging the circularly-polarized film 14 at the viewing side A of the film substrate 11, a reflected light ray that has reflected off the metal wiring layer 12 and a reflected light ray that has reflected off the metal wiring layer 15 are both absorbed by the circular polarizer film.

Such a circularly-polarized film can be, for example, manufactured by laminating a λ/4 retardation film, which is available from Teijin Chemicals Ltd., to a polarizing film, which is available from Nitto Denko Corporation. The total thickness of the circularly-polarized film is preferably 50 nm to 200 µm, but it is not particularly limited thereto.

(Adhesive Layer)

The touch sensor of the present invention preferably includes an adhesive layer provided between the first metal wiring layer and the circular polarizer film. The first metal wiring layer can be laminated on the circular polarizer film with the adhesive layer while embedding a pattern of the first metal wiring layer in the adhesive layer. A material forming this adhesive layer is not particularly limited, but it is typically an acrylic pressure sensitive adhesive. The adhesive layer has a thickness of greater than or equal to 1 µm but less than 25 µm, and more preferably 3 µm to 20 µm. According to the touch sensor of the present invention, since the first metal wiring layer has a small thickness of greater than or equal to 0.1 µm but less than 0.5 µm, it is not necessary to increase the thickness of the adhesive layer even in a case of embedding the pattern of the first metal wiring layer in the adhesive layer. In other words, since the adhesive layer can be made to have a small thickness of greater than or equal to 1 µm but less than 25 µm, the total thickness of the touch sensor can be reduced.

As set forth above, according to the present embodiment, the plurality of protrusions 31 are provided on both surfaces 11a and 11b of the film substrate 11. Thereby, the film substrate 11 is given a slippery property and resistance to abrasion. When forming the metal wiring layers 12 and 15 continuously, productivity can be improved by increasing a film formation rate thereof while maintaining a high quality. Also, the metal wiring layers 12 and 15 each has a predetermined line width, and, the circular polarizer film 14 is provided at a viewing side A of the metal wiring layer 12. Thereby, when laminating the metal wiring layers 12 and 15 on the film substrate 11, a wire break in the metal wiring due to the protrusions 31 of the film substrate 11 can be prevented, and a high reliability can be achieved. Also, the metal wiring layer 12 of a mesh pattern can be prevented from becoming bright and visually recognizable and also the metal wiring layer 15 of a mesh pattern can be prevented from becoming bright and visually recognizable, and thus a good usability can be achieved. Further, each of the metal wiring layers 12 and 15 has a thickness of greater than or equal to 0.1 µm but less than 0.5 µm. With such a configuration, the metal wiring layers 12 and 15 can be made less visually recognizable, since the side surfaces of the metal wiring layers 12 and 15 do not become bright when light from outside is obliquely incident on the touch sensor.

The touch sensor according to the present embodiment has been described above, but the present invention is not limited to the embodiment described above, and various modifications and alterations are possible based on the technical idea of the present invention.

EXAMPLE

Example of the present invention will be described below.

Example

On both surfaces of a polycycloolefin film (manufactured by Zeon Corporation, Product Name "ZEONOR") having a thickness of 100 µm, a binder (manufactured by DIC corporation, product name "ELS888") in which a plurality of particles (manufactured by Soken Chemical & Engineering Co., Ltd., product name "MX180-TA") are dispersed was applied to manufacture a film substrate having a plurality of protrusions (1.2 µm in height taking a flat surface of the film substrate as a reference) on the surface. Then, on each of the both surfaces of the film substrate on which the binder is applied, a copper layer having a thickness of 80 nm was formed by DC sputtering to form a laminated body. Then, the laminated body was immersed in an electrolyte copper plating bath to increase the thickness of each copper layer by an electrolysis plating method with a current density of 0.5 A/dm$^2$, until each of the copper layers had a total thickness of 200 nm (0.2 µm). A laminated body having copper layers on both surfaces of the film substrate was removed from the plating bath, and rinsed and dried.

Subsequently, a predetermined resist pattern was laminated on the copper layer formed over a surface of the film base at a viewing side, and the copper layer at a region where it is not required was removed by etching, and thereafter, the resist was peeled to form a first metal wiring layer having a regular square lattice shape (mesh shape) and having a line width of 6 µm, a pitch interval of 450 µm, a thickness of 0.2 µm, and an aperture ratio of 97%. The copper layer at a side opposite to the viewing side of the film substrate was similarly etched to form a second metal wiring layer having a regular square lattice shape (mesh shape) and having a line width of 6 µm, a pitch interval of 450 µm, a thickness of 0.2 µm, and an aperture ratio of 97%.

Subsequently, a touch sensor was manufactured by laminating a circular polarizer film including a linear polarizer film and a λ/4 retardation film on a surface of the first metal wiring layer with an acrylic adhesive layer having a thickness of 15 µm being interposed.

Comparative Example 1

A touch sensor was manufactured by a method similar to that of the Example, except that the plating time was changed to obtain the first and second metal wiring layers each having a thickness of 2 µm.

Comparative Example 2

A touch sensor was manufactured by a method similar to that of the Example, except that the plating time and the resist pattern were changed to obtain the first and second metal wiring layers each having a line width of 20 µm and a thickness of 2 µm.

Comparative Example 3

A touch sensor was manufactured by a method similar to that of the Example, except that the resist pattern was changed to obtain the first and second metal wiring layers each having a line width of 8 µm.

Comparative Example 4

A touch sensor was manufactured by a method similar to that of the Example, except that the resist pattern was changed to obtain the first and second metal wiring layers each having a line width of 3 µm.

Then, the touch sensors of the Example and Comparative Examples were measured and evaluated as follows.

(Measurement of Line Width and Pitch Interval of the Metal Wire Wiring Layers)

Using a microscope (manufactured by Olympus Corporation, device name "MX61L"), a micrograph was captured and each value was measured based on the captured photograph.

(Measurement of Thickness of the Metal Wiring Layer)

A part of the touch sensor manufactured by the aforementioned method was cut and cast with resin, and the cross section was observed using a microscope (manufactured by Hitachi, Ltd., device name "HF2000") and each value was measured.

(Calculation of Aperture Ratio)

An aperture ratio was calculated using the following equation:

"(aperture ratio)={(mesh opening length/pitch interval)$^2$}×100", where the pitch interval in the metal wiring layer is a length between a center of one of two electric wirings that are closely arranged in a unit pattern and a center of the other of the two electric wirings, and the length of the mesh opening is a value obtained by subtracting the aforementioned line width of the wiring from the aforementioned pitch interval.

(Measurement of Transmittance)

Using a multi beam spectrophotometer (manufactured by Hitachi, Ltd., device name "U4100"), a transmittance of 400 to 700 nm was measured and an average value thereof was obtained.

(Evaluation of a Wire Break in the Metal Wiring)

An entire surface of the manufactured touch sensor was observed with naked eyes using a magnifying glass to check whether there is any wire break.

(Evaluation of Prevention of Visual Recognition of the Mesh Pattern)

The manufactured touch sensor was visually inspected under a three wavelength light-emitting type fluorescent light source to check whether a mesh pattern is visually recognizable from both a front direction and an oblique direction, and a case in which the mesh pattern was not visually recognized was evaluated as "GOOD" and in a case where it was clearly visually recognized was evaluated as "NOT GOOD".

Results of measurements and evaluations described above are shown in Table 1.

TABLE 1

| | FIRST AND SECOND METAL WIRING LAYER | | | PREVENTION OF VISUAL |
|---|---|---|---|---|
| | LINE WIDTH μm | THICK-NESS μm | WIRE BREAK | RECOGNITION OF MESH PATTERN |
| EXAMPLE | 6 | 0.2 | NO | GOOD |
| COMPARATIVE EXAMPLE 1 | 6 | 2 | NO | NOT GOOD |
| COMPARATIVE EXAMPLE 2 | 20 | 2 | NO | NOT GOOD |
| COMPARATIVE EXAMPLE 3 | 8 | 0.2 | NO | NOT GOOD |
| COMPARATIVE EXAMPLE 4 | 3 | 0.2 | YES | GOOD |

Referring to the results in Table 1, in the Example, each of the first and second metal wiring layers had a line width of 6 μm and a thickness of 0.2 μm, and the mesh pattern was not visually recognizable from a front direction or from an oblique direction, and a wire break in the metal wiring was also not observed.

Whereas, with Comparative Example 1, each of the first and second metal wiring layers had a line width of 6 μm and a thickness of 2 μm, and although a wire break in the metal wiring was not observed, the mesh pattern was visually recognized when viewed from an oblique direction.

With Comparative Example 2, each of the first and second metal wiring layers had a line width of 20 μm and a thickness of 2 μm, and although a wire break in the metal wiring was not observed, the mesh pattern was visually recognized when viewed from a front direction and from an oblique direction.

With Comparative Example 3, each of the first and second metal wiring layers had a line width of 8 μm and a thickness of 0.2 μm, and although a wire break in the metal wiring was not observed, the mesh pattern was visually recognized when viewed from a front direction.

With Comparative Example 4, each of the first and second metal wiring layers had a line width of 3 μm and a thickness of 0.2 μm, and although the mesh pattern was not visually recognized, a wire break in the metal wiring was observed.

INDUSTRIAL APPLICABILITY

The touch sensor according to the present invention is preferably a capacitive sensing type touch sensor which is used in portable terminals such as smartphones or tablet terminals (Slate PCs).

LIST OF REFERENCE SIGNS

11 film substrate
11*a* surface
11*b* surface
12 metal wiring layer
13 adhesive layer
14 circular polarizer film
14*a* linear polarizer film
14*b* λ/4 retardation film
15 metal wiring layer
31 protrusion
31*a* surface

The invention claimed is:

1. A touch sensor comprising:
   a film substrate having a plurality of protrusions on a first surface and a second surface thereof,
   a first metal wiring layer provided as a pattern directly on the first surface of the film substrate, at a viewing side of the film substrate;
   a circular polarizer film laminated at a viewing side of the first metal wiring layer; and
   a second metal wiring layer provided as a pattern directly on the second surface of the film substrate, at a side opposite to the viewing side of the film substrate,
   wherein each of the first and second metal wiring layers have a line width of greater than 5 μm but less than 8 μm, and each of the first and second metal wiring layers having a thickness of greater than or equal to 0.1 μm but less than 0.5 μm.

2. The touch sensor according to claim 1, wherein the protrusions have an outer diameter of greater than 0 but less than or equal to 3 μm in a plan view of the first surface or the second surface of the film substrate.

3. The touch sensor according to claim 1, wherein the protrusions have a height of greater than 0 but less than 3 μm.

4. The touch sensor according to claim 1, wherein each of the first and second metal wiring layers has a flattened geometry, and a ratio of the line width to the thickness is 15 to 50.

5. The touch sensor according to claim 1, wherein each of the first and second metal wiring layers is provided in a mesh shape.

6. The touch sensor according to claim 1, wherein the film substrate is a polymer film having an optically isotropic property.

7. The touch sensor according to claim 6, wherein the polymer film comprises polycycloolefin or polycarbonate.

\* \* \* \* \*